United States Patent
Mihan et al.

(10) Patent No.: US 6,919,412 B1
(45) Date of Patent: *Jul. 19, 2005

(54) MONOCYCLOPENTADIENYL COMPLEXES OF CHROMIUM, MOLYBDENUM OR TUNGSTEN WITH A DONOR BRIDGE

(75) Inventors: Shahram Mihan, Ludwigshafen (DE); Dieter Lilge, Limburgerhof (DE); Paulus de Lange, Wesseling (DE); Günther Schweier, Friedelsheim (DE); Martin Schneider, Ludwigshafen (DE); Ursula Rief, Heddesheim (DE); Udo Handrich, Hassloch (DE); Johannes Hack, Grünstadt (DE); Markus Enders, Heidelberg (DE); Gunter Ludwig, Steinsfurt (DE); Ralph Rudolph, Mannheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/049,455

(22) PCT Filed: Aug. 1, 2000

(86) PCT No.: PCT/EP00/07442
§ 371 (c)(1),
(2), (4) Date: Jun. 5, 2002

(87) PCT Pub. No.: WO01/12641
PCT Pub. Date: Feb. 22, 2001

(30) Foreign Application Priority Data

Aug. 13, 1999 (US) .......................... 09/373715

(51) Int. Cl.[7] .............................. G08F 4/44; B01J 31/00; C07F 17/00
(52) U.S. Cl. ........................ 526/127; 502/120; 502/159; 526/160; 526/352; 526/943; 546/10; 556/11; 556/12; 556/21; 556/60
(58) Field of Search ............................... 556/11, 12, 21, 556/60; 546/10; 526/127, 160, 352, 943; 502/120, 159

(56) References Cited

U.S. PATENT DOCUMENTS 6,437,161 B1 * 8/2002 Mihan et al. .................. 556/11
6,699,948 B2 * 3/2004 Mihan et al. ................ 526/161

OTHER PUBLICATIONS

Araki et al., Chemical Abstracts, vol. 119, No. 15, p. 957, abstract No. 160483p (1993).*

* cited by examiner

*Primary Examiner*—Porfirio Nazario-Gonzalez
(74) *Attorney, Agent, or Firm*—Novak Druce & Quigg, LLP

(57) ABSTRACT

Substituted monocyclopentadienyl, monoindenyl, monofluorenyl or heterocyclopentadienyl complexes of chromium, molybdenum or tungsten, wherein at least one of the substituents of the cyclopentadienyl ring carries a rigid donor function which is not exclusively bonded through $sp^3$-hybridized carbon or silicon atoms, and a process for polymerizing olefins.

13 Claims, No Drawings

MONOCYCLOPENTADIENYL COMPLEXES OF CHROMIUM, MOLYBDENUM OR TUNGSTEN WITH A DONOR BRIDGE

The subjects of the present invention are substituted monocyclopentadienyl, monoindenyl, monofluorenyl or heterocyclopentadienyl complexes of chromium, molybdenum or tungsten, wherein at least one of the substituents on the cyclopentadienyl ring bears a rigid donor function which is not exclusively bonded through sp$^3$-hybridized carbon or silicon atoms, and a method for polymerizing olefins.

Many of the catalysts that are employed to polymerize α-olefins are based on immobilized chromium oxides (see for example Kirk-Ot-hmer, "Encyclopedia of Chemical Technology", 1981, Vol. 16, page 402). These produce among others ethylene homo- and copolymers with high molecular weights, but they are relatively invulnerable to hydrogen and thus do not allow easy control of the molecular weight. By comparison, by using bis(cyclopentadienyl) chromium (U.S. Pat. No. 3,709,853), bis(indenyl)chromium or bis(fluorenyl)chromium (U.S. Pat. No. 4,015,059), which is applied to an inorganic oxidic carrier, the molecular weight of polyethylenes can easily be controlled by adding hydrogen.

As in the Ziegler-Natta systems, with the chromium compounds as well there has been a recent search for catalyst systems with a uniformly defined active center, so-called single-site catalysts. By controlled variation of the ligand structure, the goal is for the activity, copolymerization behavior of the catalyst, and the properties of the polymers thus obtained to be capable of being changed easily.

For instance, EP-A 742 046 discloses so-called constrained geometry complexes of the 6th Subgroup, a special method for their preparation (via metal tetraamides), and a method for preparing a polyolefin in the presence of such catalysts are disclosed. The ligand structure comprises an anionic donor, which is linked to a cyclopentadienyl radical.

K. H. Theopold et al, in Organomet. (1996), 15, 5284–5286, describe an analogous {[(tert-butylamido) dimethylsilyl](tetramethylcyclopentadienyl)}chromium chloride complex for the polymerization of olefins. This complex selectively polymerizes ethylene. Comonomers such as hexene are not incorporated, nor can propene be polymerized.

This disadvantage can be overcome by using structurally quite similar systems. For instance, DE-A1 197 10 615 describes donor ligand-substituted monocyclopentadienyl-chromium compounds, with which propene for instance can also be polymerized. The donor here is from the 15th group of the periodic system and is neutral. The donor is bonded to the cyclopentadienyl ring via a $(ZR_2)_n$ fragment, in which R is a hydrogen, alkyl or aryl, Z is an atom of the 14th group of the periodic system, and n=1. DE-A1 196 30 580 states that the combination of Z=carbon with an amine donor yields good results.

WO-A 96/13529 describes reduced transition metal complexes of groups 4 through 6 of the periodic system with multi-dentate monoanionic ligands. These include among others cyclopentadienyl ligands, which preferably contain a donor function bonded via a $(CR_2)_p$ bridge, where R equals hydrogen or a hydrocarbyl radical with from 1 to 20 carbon atoms, and p=1 to 4. The preferred transition metal is titanium.

Further ligand systems in which the donor group is rigidly linked to the cyclopentadienyl radical are known. Such ligand systems and their metal complexes are, for example, summarized by P. Jutzi and U. Siemeling in J. Orgmet. Chem. (1995), 500, 175–185, Section 3. M. Enders et al, in Chem. Ber. (1996), 129, 459–463, describe 8-quinolyl-substituted cyclopentadienyl ligands and their titanium and zirconium trichloride complexes. 2-Picolylcyclopentadienyltitanium trichloride in combination with methylaluminoxane was used to polymerize olefins by M. Blais, J. Chien and M. Rausch in Organomet. (1998), 17 (17), 3775–3783.

It was now the object of the present invention to find new catalyst systems that can easily be modified and are suitable for polymerizing α-olefins.

Accordingly, substituted monocyclopentadienyl, monoindenyl, monofluorenyl or heterocyclopentadienyl complexes of chromium, molybdenum or tungsten have been found, wherein at least one of the substituents on the cyclopentadienyl ring carries a rigid donor function which is not exclusively bonded through sp$^3$-hybridized carbon or silicon atoms.

Furthermore, a method for polymerizing or copolymerizing olefins was found in which olefins are polymerized in the presence of the following components:

(A) substituted monocyclopentadienyl, monoindenyl, monofluorenyl or heterocyclopentadienyl complexes of claim 1, of the general formula (I)

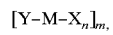

in which the variables have the following meaning:
M chromium, molybdenum or tungsten
Y is described by the following general formula II

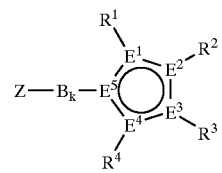

in which the variables have the following meaning:
E$^1$–E$^5$ carbon or at maximum one of E$^1$ to E$^5$ is phosphorus or nitrogen,
Z NR$^5$R$^6$, PR$^5$R$^6$, OR$^5$, SR$^5$, or an unsubstituted, substituted or condensed, partially unsaturated heterocyclic or heteroaromatic ring system,
B one of the following groups:

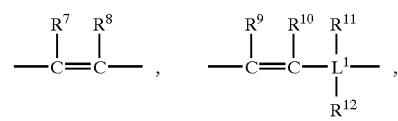

and additionally, if Z is an unsubstituted, substituted or condensed, partially unsaturated heterocyclic or heteroaromatic ring system, B can also be

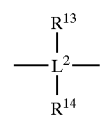

in which
L$^1$, L$^2$ denotes silicon or carbon, k denotes 1, or if Z is an unsubstituted, substituted or condensed, partially unsaturated heterocyclic or heteroaromatic ring system, is also 0, X independently of one another fluorine, chlorine, bromine, iodine, hydrogen, $C_1$–$C_{10}$ alkyl, $C_2$–$C_{10}$ alkenyl, $C_6$–$C_{20}$ aryl, alkylaryl with from 1 to 10 C atoms in the alkyl radical and from 6 to 20 C atoms in the aryl radical, $NR^{15}R^{16}$, $OR^{15}$, $SR^{15}$, $SO_3R^{15}$, $OC(O)R^{15}$, CN, SCN, β-diketonate, CO, $BF_4$—, $PF_6$—, or bulky non-coordinating anions, $R^1$–$R^{16}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, $SiR^{17}_3$, in which the organic radicals $R^1$–$R^{16}$ can also be substituted by halogens, and two geminal or vicinal radicals $R^1$–$R^{16}$ can also be joined to a 5- or 6-membered ring, $R^{17}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, and two geminal radicals $R^{17}$ can also be joined to a 5- or 6-membered ring, n is 1, 2 or 3, m is 1, 2 or 3, (B) optionally, one or more activator compounds, and (C) optionally, one or more additional catalysts conventionally used for the polymerization of olefins.

Furthermore, polymers of olefins that can be obtained by the process of the invention, as well as fibers, films and moldings which contain the olefin polymers according to the invention, have been found.

To make the binding to the cyclopentadienyl ring rigid, the mostdirect linkage with the donor function contains at least one sp- or $sp^2$-hybridized carbon atom, and preferably from one to three $sp^2$-hybridized carbon atoms. Preferably, the direct linkage includes an unsaturated double bond or an aromatic compound, or forms a partially unsaturated or aromatic heterocyclic system with the donor.

The cyclopentadienyl ring in the complexes according to the invention is typically $\eta^5$-bonded to the metal center, preferably chromium, and can also be a heterocyclicyclopentadienyl ligand; that is, at least one carbon atom can also be replaced by a hetero atom from the 15th or 16th Group. In that case, a $C_5$ ring carbon atom is preferably replaced with phosphorus. In particular, the cyclopentadienyl ring is substituted with further alkyl groups that can also form a 5- or 6-membered ring, such as tetrahydroindenyl, indenyl, benzoindenyl or fluorenyl.

The donor is a neutral functional group containing an element of the 15th or 16th group of the periodic system, such as amine, imine, carboxamide, carboxylic acid ester, ketone (oxo), ether, thioketone, phosphine, phosphite, phosphine oxide, sulfonyl, sulfonamide, or unsubstituted, substituted or condensed, partially unsaturated heterocyclic or heteroaromatic ring systems.

Preferably, the substituted monocyclopentadienyl, monoindenyl, monofluorenyl or heterocyclopentadienyl complexes of the general formula (I)

$$[Y-M-X_n]_m \qquad I,$$

in which the variables have the following meaning:

M chromium, molybdenum or tungsten

Y is described by the following general formula II

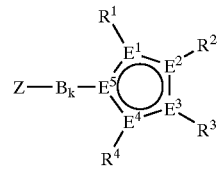

II in which the variables have the following meaning:

$E^1$–$E^5$ carbon or at maximum one of $E^1$ to $E^5$ phosphorus or nitrogen,

Z $NR^5R^6$, $PR^5R^6$, $OR^5$, $SR^5$, or an unsubstituted, substituted or condensed, partially unsaturated heterocyclic or heteroaromatic ring system, B one of the following groups:

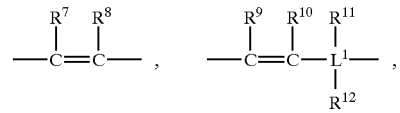

and additionally, if Z is an unsubstituted, substituted or condensed, partially unsaturated heterocyclic or heteroaromatic ring system, B can also be

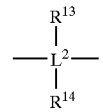

in which $L^1$, $L^2$ denotes silicon or carbon, k denotes 1 or, if Z is an unsubstituted, substituted or condensed, partially unsaturated heterocyclic or heteroaromatic ring system, is also 0, X independently of one another fluorine, chlorine, bromine, iodine, hydrogen, $C_1$–$C_{10}$ alkyl, $C_2$–$C_{10}$ alkenyl, $C_6$–$C_{20}$ aryl, alkylaryl with from 1 to 10 C atoms in the alkyl radical and from 6 to 20 C atoms in the aryl radical, $NR^{15}R^{16}$, $OR^{15}$, $SR^{15}$, $SO_3R^{15}$, $OC(O)R^{15}$, CN, SCN, β-diketonate, CO, $BF_4$—, $PF_6$—, or bulky non-coordinating anions, $R^1$–$R^{16}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, $SiR^{17}_3$, in which the organic radicals $R^1$–$R^{16}$ can also be substituted by halogens, and two geminal or vicinal radicals $R^1$–$R^{16}$ can also be joined to a 5- or 6-membered ring, $R^{17}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, and two geminal radicals $R^{17}$ can also be joined to a 5- or 6-membered ring, n is 1, 2 or 3, m is 1, 2 or 3.

The transition metal M is in particular chromium.

Y is a substituted cyclopentadienyl system, and the radical-$B_k$-Z carries a rigidly bonded donor function. The cyclopentadienyl ring is bonded to the transition metal via an $\eta^5$ bond. The donor can be bonded coordinatively or non-coordinated. Preferably, the donor is intramolecularly coordinated to the metal center.

$E^1$ to $E^5$ are preferably four carbons and one phosphorus atom or are only carbon atoms, and quite particularly preferably all of $E^1$ through $E^5$ are carbon.

Z can for instance together with the bridge B form an amine, ether, thioether, or phosphine. However, Z can also be an unsubstituted, substituted or condensed, heterocyclic aromatic ring system, which can in addition to carbon ring members contain hetero atoms from the group of oxygen, sulfur, nitrogen and phosphorus. Examples of 5-ring heteroaryl groups, which besides carbon atoms can contain from one to four nitrogen atoms and/or one sulfur or oxygen atom as ring members, are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl, or 1,2,4-triazol-3-yl. Examples of 6-membered heteroaryl groups, which can contain from one to four nitrogen atoms and/or one phosphorus atom, are 2-pyridinyl, 2-phosphabenzolyl, 3-pyridazinyl, 2-pyrimidinyl, 4-pyrimidinyl, 2-pyrazinyl, 1,3,5-triazin-2-yl, and 1,2,4-triazin-3-yl, 1,2,4-triazin-5-yl, or 1,2,4-triazin-6-yl. The 5-ring and 6-ring heteroaryl groups can also be substituted by $C_1$–$C_{10}$ alkyl, $C_6$–$C_{10}$ aryl, alkylaryl with from 1 to 10 C atoms in the alkyl radical and six to ten C atoms in the aryl radical, trialkylsilyl or halogens, such as fluorine, chlorine or bromine, or can be condensed with one or more aromatic or heteroaromatic groups. Examples of benzo-condensed 5-membered heteroaryl groups are 2-indolyl, 7-indolyl, 2-cumaronyl, 7-cumaronyl, 2-thionaphthenyl, 7-thionaphthenyl, 3-indazolyl, 7-indazolyl, 2-benzimidazolyl or 7-benzimidazolyl. Examples of benzo-condensed 6-membered heteroaryl groups are 2-quinolyl, 8-quinolyl, 3-cinnolyl, 8-cinnolyl, 1-phthalazyl, 2-quinazolyl, 4-guinazolyl, 8-quinazolyl, 5-quinoxalyl, 4-acridyl, 1-phenanthridyl or 1-phenazyl. The nomenclature and number of the heterocycles has been taken from L. Fieser and M. Fieser, Lehrbuch der organischen Chemie ["Textbook of Organic Chemistry"], 3rd revised edition, Verlag Chemie, Weinheim, 1957. In a preferred embodiment, Z is an unsubstituted, substituted or condensed, heteroaromatic ring system or $NR^5R^6$.

Simple systems are preferred here, which are easily accessible and inexpensive and are selected from the following group:

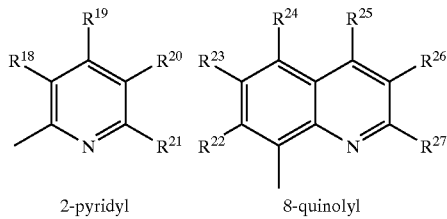

2-pyridyl        8-quinolyl

By a suitable choice of the radicals $R^{18}$ to $R^{27}$, an influence can be exerted on the activity of the catalyst and on the molecular weight of the resultant polymer. The substituents $R^{18}$ to $R^{27}$ are the same radicals as described for $R^1$ to $R^{16}$ and halogens, such as fluorine, chlorine or bromine; optionally, two vicinal radicals $R^{18}$ to $R^{27}$ can also be joined to a 5- or 6-membered ring and can also be substituted by halogens, such as fluorine, chlorine or bromine. Preferred radicals $R^{18}$ to $R^{27}$ are hydrogen, methyl, ethyl, n-propyl, n-butyl, tert.-butyl, n-pentyl, n-hexyl, n-heptyl, n-octyl, vinyl, allyl, benzyl, phenyl, naphthyl, biphenyl and anthranyl, as well as fluorine, chlorine or bromine. Organosilicon substituents are in particular trialkylsilyl groups with from 1 to 10 C atoms in the alkyl radical, especially trimethylsilyl groups. Quite particularly preferably, Z is an unsubstituted or substituted, for instance alkyl-substituted, quinolyl which is in particular linked at position 8, such as 8-quinolyl, 8-(2-methylquinolyl), 8-(2,3,4-trimethylquinolyl), 8-(2,3,4,5,6,7-hexamethylquinolyl). It is very easy to prepare and at the same time provides very good activities.

The rigid bridging B between the cyclopentadienyl ring and the functional group z is an organic diradical, consisting of carbon and/or silicon units with a chain length of one to three. The activity of the catalyst can be influenced by varying the linkage length between the cyclopentadienyl ring and the hetero atom donor. Since the type of Z also influences the number of bridging atoms between the cyclopentadienyl radical and the hetero atom, manifold combinations of B with Z can be used for purposes of influence here. B can be bonded to Z with $L^1$ or with $CR^9$. For the sake of easy preparation, the combination in which B is CH=CH or 1,2-phenylene, and Z is $NR^5R^6$, or the combination in which B is $CH_2$, $C(CH_3)_2$ or $Si(CH_3)_2$ and Z is unsubstituted or substituted 8-quinolyl or unsubstituted or substituted 2-pyridyl are preferred. Systems without bridges B, in which k is 0, are particularly easy to obtain. In this case, the preferred Z is unsubstituted or substituted quinolyl, in particular 8-quinolyl.

Various properties of the catalyst system can also be changed by varying the substituents $R^1$ to $R^{16}$. The number and type of substituents, especially $R^1$ to $R^4$, can influence the accessibility of the metal atom M for the olefins to be polymerized. For instance, it is possible to modify the activity and selectivity of the catalyst for various monomers, in particular sterically demanding monomers. Since the substituents can also have an effect on the speed of termination reactions of the growing polymer chain, the molecular weight of the resultant polymers can also be changed thereby. The chemical structure of the substituents $R^1$ to $R^{16}$ can therefore be varied within wide ranges in order to obtain the desired results and achieve a tailormade catalyst system. C-organic substituents $R^1$ to $R^{16}$ are for instance: $C_1$–$C_{20}$ alkyl, wherein the alkyl can be linear or branched, such as methyl, ethyl, n-propyl, isopropyl, n-butyl, isobutyl, tert.-butyl, n-pentyl, n-hexyl, n-heptyl, n-octyl, n-nonyl, n-decyl or n-dodecyl, 5 to 7-membered cycloalkyl, which in turn can carry a $C_6$–$C_{10}$ aryl group as a substituent, such as cyclopropane, cyclobutane, cyclopentane, cyclohexane, cycloheptane, cyclooctane, cyclononane, or cyclododedcane, $C_2$–$C_{20}$ alkenyl, wherein the alkenyl can be linear, cyclic or branched and the double bond can be internal or in a terminal position, such as vinyl, 1-allyl, 2-allyl, 3-allyl, butenyl, pentenyl, hexenyl, cyclopentenyl, cyclohexenyl, cyclooctenyl, or cyclooctadienyl, $C_6$–$C_{20}$ aryl, wherein the aryl radical can be substituted by further alkyl groups, such as phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6-, or 3,4,5-trimethylphenyl, or arylalkyl, in which the arylalkyl can be substituted by further alkyl groups, such as benzyl, o-, m-, p-methylbenzyl, 1- or 2-ethylphenyl, wherein optionally two $R^1$ to $R^{16}$ radicals can also be joined to a 5- or 6-membered ring, and the organic radicals $R^1$–$R^{16}$ can also be substituted by halogens, such as fluorine, chlorine or bromine. For organosilicon substituents $SiR^{17}_3$, the same radicals as listed above for $R^1$–$R^{16}$ are suitable as $R^{17}$, wherein two $R^{17}$ radicals can also be joined to a 5- or 6-membered ring, examples being trimethylsilyl, triethylsilyl, butyldimethylsilyl, tributylsilyl, triallylsilyl, triphenylsilyl, or dimethylphenylsilyl. Preferred $R^5$–$R^{16}$ radicals are hydrogen, methyl, ethyl, n-propyl, isopropyl, n-butyl, isobutyl, tert.-butyl, n-pentyl, n-hexyl, n-heptyl, n-octyl, vinyl, allyl, benzyl, phenyl, ortho-dialkyl- or dichloro-substituted phenyls, trialkyl- or trichloro-substituted phenyls, naphthyl, biphenyl, and anthranyl. organosilicon substituents are in particular trialkylsilyl groups with from 1 to 10 C atoms in the alkyl radical, especially trimethylsilyl groups. Especially preferred $R^5$ and $R^6$ radicals are methyl, ethyl, n-propyl, isopropyl, n-butyl, isobutyl, tert.-butyl, n-pentyl, n-hexyl, n-heptyl, n-octyl, allyl, benzyl, phenyl, or trialkylsilyl groups. Preferably, $R^1$ to $R^4$ are hydrogen, methyl, ethyl, n-propyl, isopropyl, n-butyl, isobutyl, tert.-butyl, n-pentyl, n-hexyl, n-heptyl, n-octyl, benzyl, or phenyl. In preferred transition metal complexes, $E^1E^2E^3E^4E^5$ together with $R^1R^2R^3R^4$ are monoalkylcyclopentadienyl such as 3-methylcyclopentadienyl, 3-ethylcyclopentadienyl, 3-isopropylcyclopentadienyl, 3-tert.-butylcyclopentadienyl, dialkylcyclopentadienyl such as tetrahydroindenyl, 2,4-dimethylcyclopentadienyl or 3-methyl-5-tert.-butylcyclopentadienyl, trialkylcyclopentadienyl such as 2,3,5-trimethylcyclopentadienyl, or tetraalkylcyclopentadienyl such as 2,3,4,5-tetramethylcyclopentadienyl. Compounds in which two vicinal $R^1$ to $R^4$ radicals form a condensed 6-membered ring system are also preferred, in which $E^1E^2E^3E^4E^5$ together with $R^1R^2R^3R^4$ represents an unsubstituted or substituted indenyl, such as indenyl, 2-methylindenyl, 2-ethylindenyl, 2-isopropylindenyl, 3-methylindenyl, 4-phenylindenyl, 2-methyl-4-phenylindenyl, or 4-naphthylindenyl or benzindenyl system, such as benzindenyl or 2-methylbenzindenyl. In quite particularly preferred transition metal complexes, $E^1E^2E^3E^4E^5$ together with $R^1R^2R^3R^4$ is an indenyl.

Like the metallocenes, the transition metal complexes can also be chiral. Thus on the one hand the cyclopentadienyl radical can have one or more chiral centers, or the cyclopentadienyl system itself may be only enantiotopic, so that the chirality is not induced until it has bonded to the transition metal M. This can be accomplished for instance simply by two different substituents (the donor substituents and for instance an alkyl radical) on the cyclopentadienyl ring, in order in this way to be capable of obtaining R and S enantiomers of the transition metal complexes (for the formalism of the chirality of cyclopentadienyl compounds, see R. Halterman, Chem. Rev. 92 (1992), 965–994).

The substituents X result for instance from the choice of the corresponding starting metal compounds that are used to synthesize the metal complexes, but they can also be varied afterward as well. The substituents X are in particular halogens, such as fluorine, chlorine or bromine or iodine, and among them particularly chlorine. Simple alkyl radicals, such as methyl, ethyl, propyl, butyl, vinyl, allyl, phenyl or benzyl also represent advantageous ligands X. As further ligands X, merely as an example and in no way conclusively, trifluoroacetate, $BF_4^-$, $PF_6^-$, and weakly or noncoordinating anions (see for instance S. Strauss in Chem. Rev. 1993, 93, 927–942) such as $B(C_6F_5)_4^-$ can be named. Calling the ligands X anions does not in any way define what type of bond there is with the transition metal M. For instance, if X is a non-coordinating or weakly coordinating anion, then the interaction between the metal M and the ligand X is electrostatic in nature. The various types of bonds are known to one skilled in the art.

Amides, alcoholates, sulfonates, carboxylates and β-diketonates are also especially suitable. By varying the $R^{15}$ and $R^{16}$ radicals, it is possible to fine-tune such physical properties as solubility. As the $R^{15}$ and $R^{16}$ radicals, the following are preferably used: $C_1$–$C_{10}$ alkyl, such as methyl, ethyl, n-propyl, n-butyl, tert.-butyl, n-pentyl, n-hexyl, n-heptyl, n-octyl, as well as vinyl, allyl, benzyl and phenyl. Some of these substituted ligands X are used quite particularly preferably, since they are obtainable from inexpensive and easily accessible starting materials. Thus it is a particularly preferred embodiment if X denotes dimethylamide, methanolate, ethanolate, isopropanolate, phenolate, naphtholate, triflate, p-toluene sulfonate, acetate, or acetyl acetonate.

The number n of ligands X depends on the oxidation stage of the transition metal M. Hence it is not possible to state the number n universally. The oxidation stage of the transition metals M in catalytically active complexes are usually known to one skilled in the art. Quite likely, chromium, molybdenum or tungsten are in the oxidation stage +3. However, complexes can also be used whose oxidation stage is not equivalent to that of the active catalyst. Such complexes can then be reduced or oxidized accordingly by suitable activators. Preferably, chromium complexes of oxidation stage +3 are used.

The donor Z can be coordinatively bonded to the transition metal M. This can be done inter- or intramolecularly. The donor Z is preferably coordinatively bonded intramolecularly to M. However, this can change over the course of the polymerization.

The transition metal complex of formula I can be in the form of a monomeric, dimeric or trimeric compound, in which case 1 is then 1, 2 or 3. For instance, one or more ligands X can bridge two metal centers M.

Preferred complexes are for instance 1-(8-quinolyl)-2-methyl-4-methylcyclopentadienylchromium(III) dichloride, 1-(8-quinolyl)-3-isopropyl-5-methylcyclopentadienylchromium(III) dichloride, 1-(8-quinolyl)-3-tert.-butyl-5-methyl cyclopentadienylchromium(III) dichloride, 1-(8-quinolyl)-2,3,4,5-tetramethylcyclopentadienylchromium (III) dichloride, 1-(8-quinolyl)tetrahydroindenylchromium (III) dichloride, 1-(8-quinolyl)indenylchromium(III) dichloride, 1-(8-quinolyl)-2-methylindenylchromium(III) dichloride, 1-(8-quinolyl)-2-isopropylindenylchromium(III) dichloride, 1-(8-quinolyl)-2-ethylindenylchromium(III) dichloride, 1-(8-quinolyl)-2-tert.-butylindenylchromium (III) dichloride, 1-(8-quinolyl)benzindenylchromium(III) dichloride, 1-(8-quinolyl)-2-methylbenzindenylchromium (III) dichloride, 1-(8-(2-methylquinolyl))-2-methyl-4-methylcyclopentadienylchromium(III) dichloride, 1-(8-(2-methylquinolyl))-2,3,4,5-tetramethylcyclopentadienyl-chromium(III) dichloride, 1-(8-(2-methylquinolyl)) tetrahydroindenylchromium(III) dichloride, 1-(8-(2-methylquinolyl))indenylchromium(III) dichloride, 1-(8-(2-methylquinoly))-2-methylindenylchromium(III) dichloride, 1-(8-(2-methylquinoly))-2-isopropylindenylchromium(III) dichloride, 1-(8-(2-methylquinolyl))-2-ethylindenyl-chromium(III) dichloride, 1-(8-(2-methylquinolyl))-2-tert.-butylindenylchromium(III) dichloride, 1-(8-(2-methylquinolyl))benzindenylchromium(III) dichloride, or 1-(8-(2-methylquinolyl))-2-methylbenzindenylchromium (III) dichloride.

The preparation of functional cyclopentadienyl ligands has long been known. Various ways of synthesizing these complex ligands are described for instance by M. Enders et al., in Chem. Ber. (1996), 129, 459–463, or by P. Jutzi and U. Siemeling in J. Orgmet. Chem. (1995), 500, 175–185.

The metal complexes, in particular the chromium complexes, can be obtained in a simple way if the applicable metal salts, such as metal chlorides, are reacted with the ligand ions (for instance, analogously to the examples in DE 197 10 615).

The process of the invention for polymerizing olefins can be combined with all the industrially polymerization processes at temperatures in the range from 20 to 300° C. and at pressures of 5 to 4000 bar. The advantageous pressure and temperature ranges for performing the process accordingly depend heavily on the polymerization method. Thus the catalyst systems used according to the invention can be employed in all known polymerization processes, such as in high-pressure polymerization processes in tubular reactors or autoclaves, in suspension polymerization processes, in solution polymerization processes, or in gas phase polymerization. In the high-pressure polymerization processes, which are typically performed at pressures between 1000 and 4000 bar and in particular between 2000 and 3500 bar, high polymerization temperatures are as a rule set as well. Advantageous temperature ranges for these high-pressure polymerization processes are between 200 and 280° C., and in particular between 220 and 270° C. In low-pressure polymerization processes, as a rule a temperature is set that is at least a few degrees below the softening temperature of the polymer. Particularly in these polymerization processes, temperatures between 50 and 180° C., and preferably between 70 and 120° C., are set. In suspension polymerization, polymerization is typically carried out in a suspension agent, preferably an alkane. The polymerization temperatures are generally in the range from −20 to 115° C. and the pressure is in general in the range from 1 to 100 bar. The solids content in the suspension is in general in the range from 10 to 80%. The process can be carries out discontinuously, for instance in agitator autoclaves, or continuously, for instance in tubular reactors, preferably in loop reactors. In particular, the Phillips-PF process, as described in U.S. Pat. Nos. 3,242,150 and 3,248,179 can be adopted. Among the polymerization processes named, the process according to the invention is particularly preferred as a gas phase polymerization, in particular in gas phase fluidized bed reactors, as a solution polymerization, and as a suspension polymerization, especially in loop and agitator boiler reactors. Gas phase polymerization can also be conducted in the so-called condensed, supercondensed or supercritical mode. The various polymerization processes, or one of the polymerization processes, can also be conducted in series in a polymerization cascade. To regulate the polymer properties, an additive such as hydrogen can also be used in the polymerization processes.

By the process of the invention, various olefinically unsaturated compounds can be polymerized, which also includes copolymerization. In contrast to some known iron and cobalt complexes, the transition metal complexes used according to the invention exhibit good polymerization activity even with higher α-olefins, so that their suitability for copolymerization should be especially emphasized. Olefins which are suitable are not only ethylene and α-olefins with from 3 to 12 carbon atoms, such as propene, 1-butene, 1-pentene, 1-hexene, 1-heptene, 1-octene, 1-nonene, 1-decene or 1-dodecene, but also internal olefins and non-conjugated and conjugated dienes such as butadiene, 1,5-hexadiene or 1,6-heptadiene, cyclic olefins such as cyclohexene, cyclopentene, or norbornene, and polar monomers such as acrylic acid ester, acroleine, acrylonitrile, vinyl ether, allyl ether, and vinyl acetate. Vinylaromatic compounds such as styrene can also be polymerized by the process of the invention. Preferably, at least one olefin is selected from the group of ethene, propene, 1-butene, 1-pentene, 1-hexene, 1-heptene, 1-octene, and 1-decene. A preferred embodiment of the process of the invention is characterized in that as the monomers, mixtures of ethylene with $C_3$–$C_{12}$ α-olefins are used. Unlike some iron and cobalt compounds, higher α-olefins can also be very well polymerized with the catalyst system of the invention. In further preferred embodiment of the process of the invention, an olefin selected from the group of propene, 1-butene, 1-pentene, 1-hexene, 1-heptene, and 1-octene is polymerized. Especially these last-named olefins can also, in liquefied or liquid state, form the solvent in the polymerization and copolymerization reaction.

Some of the metal complexes of the invention are intrinsically not or only slightly polymerization-active and are then, to enable developing good polymerization activity, put into contact with an activator, that is, component (B). Activator compounds are for example those of the alumoxane type, especially methylalumoxane MAO. Alumoxanes are prepared for instance by controlled addition of water, or substances containing water, to alkylaluminum compounds, in particular trimethylaluminum. Alumoxane components that are suited as cocatalysts are available commercially. It is assumed that they are a mixture of cyclic and linear compounds. The cyclic alumoxanes can be summarized by the formula $(R^{28}AlO)_s$, and the linear aluminoxanes can be summarized by the formula $R^{28}(R^{28}AlO)_sAlR^{28}{}_2$, in which s indicates the degree of oligomerization, and is a number from approximately 1 to 50. Advantageous alumoxanes essentially contain alumoxane oligomers with a degree of oligomerization of approximately 1 to 30, and $R^{28}$ is preferably a $C_1$–$C_6$ alkyl and especially preferably methyl, ethyl, butyl or isobutyl.

Besides the alumoxanes, compounds which are used in the so-called cationic activation of metallocene complexes can also be used as activator components. Such activator components are known for instance from EP-B1 0 468 537 and EP-B1 0 427 697. Such activator compounds (B) are in particular boranes, boroxines or borates such as trialkylborane, triarylborane, trimethylboroxine, dimethylaniliniumtetraaryl borate, trityltetraaryl borate, dimethylaniliniumboratabenzenes or tritylboratabenzenes (see WO-A 97/36937). Boranes or borates that carry at least two perfluorinated aryl radicals are especially preferred. Especially suitable activator compounds (B) are compounds from the group of aluminoxane, dimethylaniliniumtetrakispentafluorophenyl borate, trityltetrakispentafluorophenyl borate, or trispentafluorophenyl borane.

It is also possible to use activator compounds with elevated oxidant properties, such as silver-borates, in particular silver tetrakispentafluorophenyl borate or ferrocenium borates, in particular ferrocenium tetrakispentafluorophenyl borate or ferrocenium tetraphenyl borate.

Further activator components which are suitable are compounds such as aluminum alkyls, in particular trimethylaluminum, triethylaluminum, triisobutylaluminum, tributylaluminum, dimethylaluminum chloride, dimethylaluminum fluoride, methylaluminum dichloride, methylaluminum sesquichloride, diethylaluminum chloride, or aluminum trifluoride. The hydrolysis products of aluminum alkyls with alcohols can also be used (see for instance WO-A 95/10546).

Further activator compounds which are suitable are alkyl compounds of lithium, magnesium or zinc, such as methylmagnesium chloride, methylmagnesium bromide, ethylmagnesium chloride, ethylmagnesium bromide, butylmagnesium chloride, dimethylmagnesium, diethylmagnesium, dibutylmagnesium, methyllithium, ethyllithium, methylzinc chloride, dimethylzinc, or diethylzinc.

Sometimes it is desirable to use a combination of different activators. This is for instance known for the metallocenes in which boranes, boroxines (WO-A 93/16116) and borates are often used in combination with an aluminum alkyl. In general, a combination of different activator components with the transition metal complex of the invention is also possible.

The quantity of activator compounds to be used depends on the type of activator. In general, the molar ratio of metal complex (A) to activator compound (B) can range from 1:0.1 to 1:10000; preferred ratios are 1:1 to 1:2000. The molar ratio of metal complex (A) to dimethylaniliniumtetrakispentafluorophenyl borate, trityltetrakispentafluorophenyl borate, or trispentafluorophenylborane is between 1:1 and 1:20, preferably between 1:1 and 1:15, and especially preferably between 1:1 and 1:5, while to methylaluminoxane it is preferably between 1:1 and 1:2000 and especially preferably between 1:10 and 1:1000. Since many of the activators, such as aluminum alkyls, are simultaneously used (as so-called scavengers) for removing catalyst poisons, the quantity used depends on the contamination of the other substances used. One skilled in the art can determine the optimal quantity by simple trial and error, however.

The transition metal complex can be contacted with the activator compound or compounds either before or after contacting with the olefins to be polymerized. A preactivation with one or more activator compounds before the thorough mixing with the olefin and a further addition of the same or other activator compounds after this mixture has been contacted with the olefins is also possible. As a rule, a preactivation is done at temperatures between 10 and 100° C., preferably between 20 and 80° C.

Also, more than one of the transition metal complexes of the invention can be put into contact simultaneously with the olefin to be polymerized. This has the advantage that a wide range of polymers can thus be created. In this way, bimodal products for instance can be produced.

An equally broad product spectrum can be achieved by using the complexes of the invention in combination with at least one catalyst (C) that is conventionally used for the polymerization of olefins. Catalysts (C) are in particular classical titanium-based Ziegler-Natta catalysts, classical Phillips catalysts based on chromium oxides, metallocenes, the so-called constrained geometry complexes (see for instance EP-A 0 416 815 or EP-A 0 420 436), nickel and palladium bisimine systems (for whose preparation, see WO-A 98/03559), iron and cobalt pyridine bisimine compounds (for whose preparation, see WO-A 98/27124) or chromium amides (see for instance 95 JP-170947) can be used in particular. Thus by such combinations, it is for instance possible to prepare bimodal products, or comonomers can be created in situ. Preferably, at least one transition metal complex (A) is used in the presence of at least one catalyst (C) that is usual for the polymerization of olefins, and optionally one or more activator compounds (B) is used as well. Depending on the catalyst combinations (A and C), one or more activators are advantageous. The polymerization catalysts (C) can also supported and used simultaneously, or can be used in an arbitrary order with the complex (A) of the invention.

The catalysts (A) of the invention are optionally supported by an organic or inorganic carrier and used in supported form in the polymerization. This is one usual method of avoiding deposits in the reactor and of controlling the polymer morphology. Carrier materials are preferably silica gel, magnesium chloride, aluminum oxide, mesoporous materials, aluminosilicates, and organic polymers such as polyethylene, polypropylene or polystyrene, in particular silica gel or magnesium chloride.

The activator compounds (B) and the metal complex (A) can be contacted with the carrier in various orders or simultaneously. As a rule, this is done in an inert solvent, which can be filtered off or evaporated after the immobilization. It is also possible, however, to use the still-moist supported catalyst. Thus either the mixing of the carrier with the activator compound or compounds can be done first, or the carrier is first contacted with the polymerization catalyst. A preactivation of the catalyst with one or more activator compounds is also possible before mixing with the carrier. The quantity of metal complex (A) (in mmol) per gram of carrier material can vary broadly, for instance between 0.001 and 1. The preferred quantity of metal complex (A) per gram of carrier material ranges between 0.001 and 0.5 mmol per gram, and especially preferably between 0.005 and 0.1 mmol per gram. In one possible embodiment, the metal complex (A) is produced in the presence of the carrier material. A further way of immobilizing is the prepolymerization of the catalyst system, with or without prior supporting it.

By the process of the invention, polymers of olefins can be prepared. The term "polymerization", as used here to describe the invention includes both polymerization and oligomerization; that is, by these methods, oligomers and polymers with molecular weights in the range from about 56 to 4,000,000 can be created.

Because of their good mechanical properties, the polymers and copolymers of olefins which are produced with the complexes of the invention are especially well suited to producing films, fibers and moldings. This is true for both the polymers and copolymers, which are obtained by using one or more of the substituted monocyclopentadienyl, monoindenyl, monofluorenyl or heterocyclopentadienyl complexes of chromium, molybdenum or tungsten, according to the invention, and also applies to the combinations of these with one or more catalysts (C) that are conventionally used for the polymerization of olefins.

The catalysts of the invention exhibit very good productivities. Compared with the results of DE-A 197 10 615, one finds better (pressure-averaged) activities, especially at polymerization conditions that are industrially relevant (polymerization time, one hour).

Unexpectedly, the complexes of the invention are also distinguished by good thermal stability. They can, for instance, be heated without decomposition in reflux in toluene over a period of several hours.

The following examples illustrate the invention:

Unless otherwise noted, all experiments were carried out under conditions of air and moisture exclusion. Toluene and THF were dried via a molecular sieve column or sodium/benzophenone and distilled. Triisobutylaluminum (2 M in heptane) was procured from Witco GmbH, MAO (methylaluminoxane, 10% in toluene) and N,N'-dimethylaniliniumtetrakis(pentafluorophenyl) borate from Albemarle, and MAO (methylaluminoxane, 30% in toluene) from Witco.

The starting compounds named below were prepared in accordance with the directions in the literature cited:

8-bromoquinoline
 a) J. Mirek, Roczniki Chem. 1960, 34, 1599–1606;
 b) E. Reimann, in Houben-Weil, Methoden der Organischen Chemie [Methods of Organic Chemistry], 4th ed., Vol. E7a, 366

8-bromo-2-methylquinoline: C. M. Leir, J. Org. Chem. 1977, 42, 911–913

2,3,4,5-tetramethylcylopent-2-enone: F. X. Kohl, P. Jutzi, J. Organomet. Chem. 1983, 243, 119–121

2,3-dimethylcyclopent-2-enone
a) M. Dorsch, V. Jäger, w. Sponlein, Angew. Chem. [Applied Chemistry] 1984, 96, 815–16; Angew. Chem., Int. Ed. Engl. 1984, 23, 798;
b) M. Dorsch, Dissertation, Universität Würzburg [University of Würzburg, Germany] 1985

1-(8-quinolyl)-2,3,4,5-tetramethylcyclopentadiene and 1-(8-quinolyl)-2,3,4,5-tetramethyl)trimethylsilylcyclopentadiene: M. Enders, R. Rudolph, H. Pritzkow, Chem. Ber. (1996), 129, 459–463.

Analysis

NMR specimens were placed in containers in inert gas and optionally melted in. In the $^1$H- and $^{13}$C-NMR spectra, the solvent average signals, whose chemical shift to TMS was recalculated, served as an internal standard. NMR measurements were done using a Bruker AC 200 and, in particular in the case of COSY experiments, a Bruker AC 300.

Mass spectra were measured using a VG Micromass 7070H and a Finnigan MAT 8230. High-resolution mass spectra were measured using the Jeol JMS-700 and VG ZAB 2F equipment.

Elementary analyses were determined using a Heraeus CHN-O-Rapid.

The comonomer content of the polymer (% $C_6$), its methyl side chain content per 1000 C atoms in the polymer chain ($CH_3/1000$), and its density were determined by IR spectroscopy.

The η value was determined with an automatic Ubbelohde viscometer (Lauda PVS 1) using decahydronapthalene as a solvent, at 130° C. (ISO 1628 at 130EC, 0.001 g/ml of decahydronapthalene).

The determination of the molar mass distributions and the average values Mn, Mw and Mw/Mn derived from them were done by high-temperature gel permeation chromotography in accordance with DIN 55672, under the following conditions: Solvent: 1,2,4-trichlorobenzene; flow rate: 1 ml/min; temperature: 140° C.; calibration by PE standards.

Abbreviations Used:
Cp cyclopentadienyl
Me methyl
Ph phenyl
Cat. catalyst (the transition metal complex of the invention)
Sup. Cat. supported catalyst
T temperature during the polymerization
t duration of the polymerization
p pressure during the polymerization
Mw weight average molecular weight
Mn number average molecular weight
Tm melting temperature
η Staudinger index (viscosity)
Density Polymer density
$CH_3/1000$ number of methyl side chains per 1000 C atoms
% $C_6$ comonomer content of the polymer, in weight-%
THF tetrahydrofuran
MAO methylaluminoxane General Formulation for Synthesis:

Ligand Syntheses:

8-bromoquinoline or N,N-dimethylaniline were mixed with an equimolar quantity of n-BuLi and then reacted with tetramethylcyclopentenone or 1-indanone. After hydrolysis and acid-catalysed elimination of water, the corresponding ligand was isolated (yields between 40 and 70%).

Complex Syntheses:

The ligand anions were produced by deprotonization with n-BuLi or potassium hydride and mixed with the corresponding metal halide. Cleaning was done by reprecipitation or recrystallization (yields as a rule approximately 60%).

EXAMPLE 1

1.1. Preparation of 1-(2-N,N-dimethylaminophenyl)-2,3,4,5-tetramethylcyclopentadiene 80.0 ml (0.20 mmol) of n-BuLi in hexane, 2.5 M, were slowly added dropwise at 0° C. to 30.0 g (0.25 mol) of N,N-dimethylaniline. The mixture was then heated in reflux for 52 hours. After the orange solution had cooled to room temperature, 27.6 g (0.20 mol) of tetramethylcyclopentenone was added slowly and boiling was done for a further 48 hours in reflux. After cooling down to room temperature, the orange suspension was poured on ice and brought to pH=2 with concentrated hydrochloric acid. The red solution was stirred for a further 30 minutes and made alkaline with concentrated ammonia solution. The organic phase was separated from the aqueous phase, and the aqueous phase was extracted with diethyl ether. The combined organic phases were dried, and the solvent was removed under vacuum. The raw product was distilled in a vacuum using a 10 cm Vigreux column at 110 to 115° C. and $10^{-2}$ mbar, and thus 14.2 g of 1-(2-N,N-dimethylaminophenyl)-2,3,4,5-tetramethylcyclopentadiene (30%) was obtained in the form of an orange-colored oil.

1.2. Preparation of dichloro-[1-(2-N,N-dimethylaminophenyl)-2,3,4,5-tetramethylcyclopentadienyl]chromium(III)

A solution of 1.66 mmol of lithium 1-(2-N,N-dimethylaminophenyl)-2,3,4,5-tetramethylcyclopentadienyl in 20 ml of THF (from 0.4 g of the corresponding cyclopentadienyl compound (1.66 mmol) and 0.66 ml of 2.5 M BuLi in hexane (1.66 mmol)) was added slowly dropwise with a transfer cannula via a septum at room temperature to a suspension of 0.6 g of $CrCl_3$ $(THF)_3$ (1.66 mmol) in 50 ml of THF. The reaction mixture was stirred for 12 hours, and then all the volatile components were removed from the blue-green suspension in a high vacuum. The solid residue was distributed in toluene and filtered. After multiple extraction of the frit residue with hot toluene, the solvent was removed from the combined extracts. The blue-green powder obtained was washed with hexane and dried in a high vacuum. It was possible to obtain crystals of the product from a toluene solution at −30° C. 0.47 g (79%) of dichloro-[1-(2-N,N-dimethylaminophenyl)-2,3,-4,5-tetramethylcyclopentadienyl]chromium(III) were isolated.

MS (EI):m/z (%)=362 (10, M$^+$); 326 (100, M$^+$-HCl); 311 (72, M$^+$- HCl, —CH$_3$); 290 (14, M$^+$-2 HCl); 241 (32, CpMe$_4$(PhNMe$_2$)H$^+$); 224 (CpMe$_4$(PhNMe$_2$)$^+$-CH$_3$, —H); 209 (CpMe$_4$(PhNMe$_2$)$^+$-2CH$_3$, —H); 120 (10, N,N-dimethylaniline$^+$)

EXAMPLE 2

Preparation of bis{[1-(2-N,N-dimethylaminophenyl)-2,3,4,5-tetramethylcyclopentadienyl]dicarbonylchromium(I)}

Chromohexacarbonyl (1.14 g, 5.17 mmol) was suspended in 50 ml of n-decane, and 0.8 g of 1-(2-N,N-dimethylaminophenyl)-2,3,4,5-tetramethylcyclopentadiene (3.45 mmol)

were added. After slow heating to 200° C. and boiling in reflux, a black-brown suspension was formed. After that, the n-decane was removed in a vacuum ($5\times10^{-1}$ mbar, 60° C.); the residue was distributed in dichloromethane and applied to a column (12 cm, $Al_2O_3$, 5% $H_2O$). With dichloromethane, a single, green fraction was eluted. After removal of the solvent in a high vacuum, 0.52 g of bis{[1-(2-N,N-dimethylaminophenyl)-2,3,4,5-tetramethylcyclopentadienyl]dicarbonylchromium(I)} (22%) was obtained.

1H-NMR: (200 MHz, $CD_2Cl_2$) δ=1.64, 1.88 (s), 24H, cyclopentadienyl-$CH_3$); 2.26 (s, 12H, N—$CH_3$); 6.88 (d, 2H, CHAr); 7.00 (t, 2H, CHAr); 7.15–7.21 (m, 2H, CHAr); 7.53 (d, 2H, CHAr).

13C-NMR: (50 MHz, $CD_2Cl_2$) δ=9.74, 10.22 (Cp-$CH_3$); 29.69 101.07 (Cp, q); 42.68 (N—$CH_3$); 124.8, 101.3 (CAr, q); 117.6, 120.8, 128.15, 135.98 (CAr, t).

MS (EI):m/z (%)=669 (78, $M^+$-CO, +H), 584 (52, $M^+$-4 CO), 290 (100, $M^+/2$-2CO-2H), 241 (20, $CpMe_4$ $(PhNMe_2)^+$)

FT-IR: ($CH_2Cl_2$) ν ($cm^{-1}$)=1849.5 (vs, $v_{M-C=O)}$, 1875.5 (m, $v_{M-C=O}$).

EXAMPLE 3

Photochemical preparation of dichloro-[1-(2-N,N-dimethylaminophenyl)-2,3,4,5-tetramethylcyclopentadienyl]chromium(III)

A solution of 0.15 g of bis{[1-(2-N,N-dimethylaminophenyl)-2,3,4,5-tetramethylcyclopentadienyl] dicarbonylchromium(I)} (0.21 mmol) in 50 ml of dichloromethane was irradiated for 48 hours with a highpressure mercury lamp. A color change of the initially green solution to blue was observed. After the termination of the irradiation, the reaction mixture was concentrated in a vacuum and covered with a hexane layer at room temperature. Blue needles crystallized out of the hexane layer. Their EI mass spectroscopic analysis showed that they were the complex of dichloro-[1-(2-N,N-dimethylaminophenyl)-2,3,4,5-tetramethylcyclopentadienyl]chromium(III) (0.05 g, 32%).

EXAMPLE 4

Preparation of 1-[2-(N,N-dimethylaminophenyl)] indene

At room temperature while stirring, 36 ml of n-BuLi (2.5 M in hexane, 0.09 mmol) was added dropwise to 18 g of N,N-dimethylaniline (0.14 mmol). After the addition was ended, the mixture was boiled at 100° C. in reflux for 72 hours. The product was a yellow suspension, into which 11.8 g of 1-indanone (0.09 mmol) in 30 ml of THF was added dropwise with ice cooling. The resulting mixture was boiled in reflux for another three hours. After cooling to room temperature, ice and then hydrochloric acid to pH 1 was added and the micxture was stirred for 30 minutes. Next, the product was neutralized with ammonia solution and stirred for another half hour. The phases were separated; the aqueous phase was extracted with diethyl ether; the combined organic phases were dried and filtered and concentrated until dry in a vacuum. The hydroxy compound was obtained as a raw product, which when treated again with hydrochloric acid until the pH was 0, heated for two hours in reflux, and then neutralized and distilled at 125° C. and $7\times10^{-2}$ mbar yielded 3.1 g of 1-[2-(N,N-dimethylaminophe-nyl)]indene (14%) in the form of brown oil.

MS (EI):m/z (%)=235 ($M^+$, 100.0), 220 ($M^+$-$CH_3$, 52).

EXAMPLE 5

Synthesis of 1-(8-quinolyl)-2,3-dimethylcyclopentadiene 5 ml of n-BuLi (2.5 M in hexane, 12.5 mmol) were added at −95° C. dropwise to a solution of 2.5 g of 8-bromoquinoline (12 mmol) in 120 ml of THF; this was stirred for 15 minutes, and then 1.3 g of 2,3-dimethylcyclopent-2-enone (12 mmol), dissolved in 10 ml of THF, was added. After warming to room temperature, the solution was heated for one hour in ref lux. The cooled reaction mixture was hydrolized with ice, acidified with hydrochloric acid, and then neutralized with ammonia solution. The aqueous phase was extracted with diethyl ether, and the combined organic phases were dried. Distillation at 150° C. and 0.05 mbar yielded 1.1 g of 1-(8-quinolyl)-2,3-dimethylcyclopentadiene (40%) in the form of a yellow, viscous oil.

1H-NMR: (200 MHz, $CDCl_3$) δ=1.90 (s, 3H, $CH_3$); 2.03 (s, 3H, $CH_3$); 3.59 (m, 2H, $CH_2$); 6.19 (s, 1H, CH); 7.32–7.73 (m, 4H, quinoline-H); 8.13 (dd, 1H); 8.89 (dd, 1H).

13C-NMR: (50 MHz, $CDCl_3$) δ=12.4, 14.1 ($CH_3$); 44.4 ($CH_2$); 120.5, 125.8, 126.3, 127.1, 129.8, 135.9, 149.4 (CH); 128.5, 135.9, 139.1, 140.0, 143.8, 146.8 (quart. C).

MS (EI):m/z (%)=221 (86) [$M^+$]; 220 (100) [$M^+$-H]; 206 (31) [$M^+$-$CH_3$]; 191 (9) [$M^+$-2$CH_3$].

EXAMPLE 6

Preparation of dichloro-[1-(8-quinolyl)-2,3,4,5-tetramethylcyclopentadienyl]chromium(III) from 1-(8-quinolyl)-2,3,4,5-tetramethylcyclopentadienyl] potassium 0.4 g of 1-(8-quinolyl)-2,3,4,5-tetramethylcyclopentadiene (1.61 mmol) was added to a stirred mixture of 0.06 g of potassium hydride (1.61 mmol) and 20 ml of THF. After three hours of stirring, a red solid precipitated out of the solution. This suspension was transferred with a transfer cannula into a mixture of 0.6 g of $CrCl_3$ $(THF)_3$ in 20 ml of THF at room temperature. After 16 hours of stirring, the THF was removed in a high vacuum, and the solid was distributed in toluene. The insoluble potassium chloride was filtered off. The solvent was removed; the residue was washed with hexane and dried in a high vacuum. The product was isolated as 0.4 g of green powder with a 70% yield.

MS (EI):m/z (%)=370 (12, $M^+$); 334 (19, $M^+$-Cl); 249 (99, $Me_4C_5$(quinoline)$^+$-H)

HR-EI-MS: 370.02213 (calculated), 370.02203 (measured).

EXAMPLE 7

Preparation of dichloro-[1-(8-quinolyl)-2,3,4,5-tetramethylcyclopentadienyl]chromium(III) from 1-(8-quinolyl)-2,3,4,5-tetramethyltrimethyl-silylcyclopentadiene 0.08 g of $CrCl_3$ $(THF)_3$ (0.23 mmol) were suspended in 20 ml of toluene, and 0.08 g of 1-(8-quinolyl)-2,3,4,5-tetramethyltrimethylsilylcyclopentadiene (0.23 mmol) were added. The reaction mixture was heated in reflux for three hours, and after a further 16 hours of stirring at room temperature the toluene was distilled off in a high vacuum. The green powder obtained was washed with hexane and dried in a high vacuum.

MS (EI):m/z (%)=370 (12, $M^+$); 334 (19, $M^+$-Cl); 249 (99, $Me_4C_5$(quinoline)$^+$-H)

EXAMPLE 8

1-(8-quinolyl)indenylchromium(III) dichloride

8.1. Preparation of 1-(8-quinolyl)indene 30 8-bromoquinoline (10.4 g, 50 mmol) was first placed in 100 ml of THF and cooled to approximately −100° C. 20 ml of n-BuLi (2.5 M in hexane, 50 mmol) were added dropwise, and the internal temperature was kept below −80° C. After the addition was ended, stirring was continued for a further 15 minutes at −80° C., and then 6.6 g of 1-indanone (50 mmol), dissolved in 30 ml of THF, were added dropwise. The reaction mixture was then allowed to return to room temperature slowly and then heated for three hours. in reflux. Once the mixture had cooled to room temperature, first ice and then hydrochloric acid was added to approximately pH 1, and the mixture was stirred for 30 minutes. The aqueous and organic phases were separated; the aqueous phase was mixed with ammonia solution to a pH of approximately 9 and extracted with ether, and the combined organic phases were then concentrated until dry in a vacuum. The thus-obtained viscous oil (1-(8-quinolyl)-indan-1-ol (8H$_2$O)) was mixed with hydrochloric acid until the pH was 0, heated for two hours in reflux, and then neutralized. After processing and drying, 6.6 g of 1-(8-quinolyl)indene (55%) were obtained in the form of a colorless solid.

1-(8-quinolyl)-indan-1-ol (8H$_2$O)

1H-NMR: (200 MHz, CDCl$_3$) δ=2.58–2.87 (m, 3H, CH$_2$); 6.94 (dd, 1H, quinoline CH); 7.24–7.36 (m, 4H, CH); 7.44–7.50. (m, 2H, H3, H6); 7.70 (dd, 1H, quinoline CH); 8.23 (dd, 1H); 8.66 (s, br, 1H, OH); 8.92 (dd, 1H).

13C-NMR: (200 MHz, CDCl$_3$) δ=30.2, 44.8 (CH$_2$); 87.2 (COH); 120.8, 124.7, 125.1, 126.4, 126.9, 127.2, 127.5, 128.2, 137.9, 147.7 (CH); 127.4, 129.2, 142.6, 143.8, 146.7 (quart. C).

1-(8-quinolyl)indene

Melting point: 108° C.

$^1$H-NMR: (200 MHz, CDCl$_3$) δ=3.69 (d, 2H, CH$_2$); 6.80 (t, 1H, =CH); 7.12–7.26 (m, 3H); 7.41 (dd, 1H); 7.55–7.64 (m, 2H); 7.81–7.88 (m, 2H); 8.21 (dd, 1H); 8.92 (dd, 1H).

$^{13}$C-NMR: (50 MHz, CDCl$_3$) δ=38.8 (CH$_2$); 121.0, 121.2, 123.8, 124.5, 125.8, 126.3, 127.8, 130.0, 133.5, 136.1, 150.0 (CH); 128.6, 135.9, 143.7, 144.0, 145.6, 146.7 (quart. C).

MS (EI):m/z (%)=243 (65) [M$^+$]; 242 (100) [M$^+$-H].

HR-MS (EI): 243.1048 (calculated), 243.1038 (found).

C, H, N analysis: Calculated: 88.86% C, 5.39% H, 5.75% N. Found: 87.55% C, 5.52% H, 5.92% N.

8.2. Preparation of dichloro-[1-(8-quinolyl)indenyl]chromium(III)

0.05 g of potassium hydride (1.23 mmol) were suspended in 20 ml of THF, and 0.3 g of 1-(8-quinolyl)indene (1.23 mmol) were added slowly. After stirring for three hours at room temperature, the obtained violet suspension was added dropwise to a mixture of 0.46 g of chromium(III) chloride× 3THF (1.23 mmol) in 50 ml of THF, and subsequently the mixture was stirred for a further 16 hours. The solvent was removed in a vacuum and the solid thus obtained was extracted using hot toluene. After the solvent had been distilled off from the combined extracts, the product was in the form of a green powder, which was washed several times with hexane and dried in a high vacuum. 0.22 g of dichloro-[1-(8-quinolyl)indenyl]chromium(III) (50%) was obtained.

Alternatively, it was also possible to distribute the residue in methylene chloride, and after the filtration off of potassium chloride and removal of the solvent, the chromium complex was again obtained.

MS (EI):m/z (%)=364 (0.2, M$^+$); 329 (0.1, M$^+$-Cl); 242 (100, ind(quinoline)$^+$)

HR-EI-MS: 363.97519 (calculated), 363.97615 (measured)

EXAMPLE 9

9.1. Preparation of 1-(8-quinolyl)-2-methylindene 6.70 ml of n-BuLi (16.8 mmol) was added dropwise at 100° C. to a solution of 3.50 g of o-bromoquinoline (16.8 mmol) in 50 ml of THF, and the mixture was stirred for 15 minutes at 80° C. Next, a solution of 50 ml of THF and 2.45 g of 2- methyl-1-indanone (16.8 mmol) was added within ten minutes to the lithiated bromoquinoline. The solution was left to return to room temperature, and subsequently boiled for three hours in reflux. After cooling to room temperature, ice was added and the mixture was acidified to pH 1 with hydrochloric acid, and subsequently heated under relfux for three hours. The reaction mixture was adjusted with ammonia solution to pH 9, and the aqueous phase was extracted with diethyl ether. The combined organic phases were dried, and the solvent was removed. The raw product was purified by distillation in a vacuum at 150 to 160° C. and 10$^{-2}$ mbar. 1.5 g of 1-(8-quinolyl)-2-methylindene (45%) were obtained in the form of a viscous yellow resin.

9.2. Preparation of dichloro-[1-(8-quinolyl)-2-methylindenyl]chromium(III)

1-(8-quinolyl)-2-methylindene (0.3 g, 1.16 mmol) were added dropwise, while being cooled with ice, to a suspension of 0.04 g of potassium hydride (1.16 mmol) in 10 ml of THF. The resulting mixture was then warmed to room temperature and stirred for three hours. The deep-violet solution was added dropwise at −30° C. to CrCl$_3$ (THF)$_3$ in 20 ml of THF. Subsequently, the reaction mixture was heated, the solvent was removed in a vacuum, the residue was extracted with warm toluene, and precipitated potassium chloride was filtered off. After the removal of the solvent in a high vacuum, 0.35 g of dichloro-[1-(8-quinolyl)-2-methylindenyl]chromium(III) (79%) in the form of a green powder was obtained.

EXAMPLE 10

10.1. Preparation of 1-(2-methyl-8-quinolyl)-2,3,4,5-tetramethylcyclopentadiene A solution of 4.4 g of 8-bromo-2-methylquinoline (20 mmol) in 50 ml of THF was cooled to −78° C., and 8.8 ml of n-BuLi (2.5 M in hexane, 22 mmol) was added dropwise while stirring. After ten minutes of stirring, 3.5 g of 2,3,4, 5-tetramethylcyclopentenone (25 mmol) was added dropwise; the solution was heated to room temperature and then heated in reflux for one hour. The solution was cooled down; ice and hydrochloric acid to approximately pH 1 were added; and after neutralization with ammonia solution, the phases were separated and the aqueous phase was extracted with pentane. The combined organic extracts were dried, the pentane was removed in a vacuum, and the remaining brown oil was distilled in a high vacuum (boiling point: 115° C. at 0.01 mbar). A 60% yield (3.2 g) of 1-(2-methyl-8-quinolyl)-2,3,4,5-tetramethylcyclopentadiene in the form of yellow, viscous oil was obtained.

1H-NMR: (200 MHz, CDCl$_3$) δ=6a: 1.55 (s, 6H); 1.78 (s, 6H); 2.64 (s, 3H); 5.53 (s, 1H); 6.84 (dd, 1H); 7.12–7.50 (m, 3H); 7.90 (d, 1H). 6b: 0.71 (d, $^3$J(H,H)=7.6 Hz, 3H); 1.82 (s, 3H); 1.87–1.88 (m, 6H); 2.58 (s, 3H); 4.20 (m, 1H); 7.09–7.55 (m, 4H); 7.89 (d, 1H).

13C-NMR: (50 MHz, CDCl$_3$) δ=6a: 11.2, 11.3 (CH$_3$); 25.6 (quinoline CH$_3$); 56.3 (allyl CH); 121.3, 125.7, 126.4, 130.5, 136.2 (quinoline CH), 135.6, 138.9, 139.0, 1412.8, 147.0, 157.4 (quart. C). 6b: 12.0, 12.2, 13.0, 14.2 (CH$_3$); 25.7 (quinoline CH$_3$); 52.1 (allyl CH); 121.4, 125.0, 125.3, 125.8, 136.0 (quinoline CH); 126.7, 126.8, 131.2, 134.6, 138.4, 142.7, 146.7, 157.8 (quart. C).

MS (EI):m/z (%)=263 (85) [M$^+$]; 262 (100) [M$^+$-H]; 248 (98) [M$^+$-CH$_3$]; 232 (20) [M$^+$-H-2CH$_3$]; 218 (10) [M$^+$-3CH$_3$].

HR-MS (EI): 263.1674 (calculated), 263.1647 (found).

10.2. Preparation of dichloro±[1-(2-methyl-8-quinolyl)-2,3,4,5-tetramethylcyclopentadienyl]chromium(III)

0.3 g of 1-(2-methyl-8-quinolyl)-2,3,4,5-tetramethylcyclopentaiene) (1.14 mmol) in 30 ml of THF was deprotonized with 0.45 ml of n-butyllithium (2.5 M in hexane, 1.14 mmol). After two hours of stirring, the red solution was dripped onto a suspension of chromium(III) chloride in 20 ml of THF. After 16 hours of stirring at room emperature, the solvents were condensed off, and the thus obtained esidue was distributed in 20 ml of toluene. The green suspension was filtered, and the residue was extracted multiple times with hot toluene. After the usual processing, the product was obtained in the form of a green powder (0.22 g) in a 50% yield.

MS (EI):m/z (%)=384 (54, M$^+$); 348 (100, M$^+$-Cl); 263 (62, M$^+$-2Cl-Cr+2H); 248 (49, M$^+$-2Cl—Cr—CH).

HR-EI-MS: 384.03778 (calculated), 384.03775 (measured).

EXAMPLES 11–27

Polymerization with Ethene

The polymerization examples listed in Table 1 were performed at an ethene pressure of 1 bar in a 50- and 250-ml flask with an overpressure valve.

The complexes were suspended in the applicable quantity of toluene and activated with the appropriate quantity of methylaluminoxane, forming homogeneous violet solutions. Ethene was then passed over while stirring. The reaction vessel was kept at the indicated temperature using a water bath. After the completion of the polymerization, the polymers obtained were was obtained in the form of a white solid, which was filtered off, washed with methanol, and dried at 90° C.

In Examples 11–16, the complex from Example 1, dichloro-[1-(2-N,N-dimethylaminophenyl)-2,3,4,5-tetramethylcyclopentadienyl]chromium(III), was used;

in Examples 17–20, the complex from Example 6, dichloro-[1-(8-quinolyl)-2,3,4,5-tetramethylcyclopentadienyl]chromium(III), was used; and in Examples 21–27, the complex from Example 8, dichloro-[1-(8-quinolyl)indenyl]chromium(III), was used.

TABLE 1

Polymerization of Ethylene

| Ex | Amount Cat. [mmol]/[mg] | T [° C.] | t [min] | PE [g] | Toluene [ml] | Activity [kg/mol Cr · h] | Al:Cr | M$_w$ [g/mol] | M$_w$/M$_n$ | T$_m$ [° C.] | η [dl/g] |
|---|---|---|---|---|---|---|---|---|---|---|---|
| 11 | 0.11/40 | 21 | 30 | 2.45 | 30 | 44.5 | 1000:1 | | | 106 | |
| 12 | 0.027/10 | 21 | 20 | 2.08 | 30 | 85.0 | 100:1 | | | 125–129 | |
| 13 | 0.0027/1 | 21 | 30 | 1.82 | 30 | 1398 | 1000:1 | | | | |
| 14 | 0.0054/2 | 21 | 30 | 3.66 | 30 | 1392 | 1000:1 | 0.4 · 10$^5$ | 24.5 | 128 | 0.27 |
| 15 | 0.0054/2 | 21 | 30 | 3.62 | 30 | 1407 | 1000:1 | | | | |
| 16 | 0.0054/2 | 21 | 30 | 10.20 | 200 | 3715 | 1000:1 | | | | |
| 17 | 0.067/25 | 21 | 30 | 0.85 | 30 | 25.4 | 100:1 | | | 125 | |
| 18 | 0.027/10 | 21 | 30 | 5.00 | 30 | 1370 | 1000:1 | | | 122–125 | |
| 19 | 0.0027/1 | 21 | 45 | 4.97 | 30 | 2365 | 1000:1 | | | 126–130 | |
| 20 | 0.0027/1 | 21 | 30 | 1.62 | 30 | 1237 | 1000:1 | | 5.58 | 127 | 1.87 |
| 21 | 0.013/5 | 21 | 10 | 1.35 | 30 | 623 | 100:1 | 115159 | 7.63 | 132 | 2.84 |
| 22 | 0.0054/2 | 21 | 15 | 1.38 | 30 | 1027 | 1000:1 | | | | |
| 23 | 0.0054/2 | 21 | 30 | 10.20 | 200 | 3715 | 1000:1 | 221176 | 47.3 | 125–130 | 3.16 |
| 24 | 0.0054/2 | 120 | 15 | 0.90 | 200 | 666 | 1000:1 | | | | |
| 25 | 0.0054/2 | 120 | 30 | 1.06 | 200 | 314 | 1000:1 | | | | |
| 26[a] | 0.0054/2 | 120 | 15 | 1.70 | 200 | 633 | 1000:1 | | | | |
| | | 21 | +15 | | | | | | | | |
| 27 | 0.0054/2 | 21 | 30 | 1.79 | 30 | 1325 | 1000:1 | 219141 | 2.17 | 130–135 | 2.16 |

[a] The polymerization was first performed for 15 minutes at 120° C. and then for 15 minutes at 21° C.

EXAMPLE 28

Copolymerization of Ethene with 1-hexene, Using 1-(8-quinolyl)indenylchromium(III) Dichloride as a Catalyst.

The experiment was performed analogously to Examples 11–27 in the presence of 10 ml of 1-hexene. 2 mg (0.0054 mmol) of chromium complex from Example 8 in 100 ml of toluene were used. The Al:Cr ratio was 1000:1. The polymerization was discontinued after 30 minutes. 3.09 g of copolymer were isolated. This corresponds to an activity of 1144 g of polymer/(mmol·bar·h).

EXAMPLES 29–51

Polymerization of Ethene and Copolymerization of Ethene with 1-hexene

The polymerization experiments were performed in a 1-liter fourneck flask, provided with a contact thermometer, agitators with a teflon blade, bowel shaped electrical heater and gas introduction tube. In an argon atmosphere, between 5 and 20 μmol of each of the complexes were placed beforehand in 250 ml of toluene at 40° C.

In the activation with MAO, the respective quantities of 1.6 M MAO solution in toluene listed in Table 2 were added.

In the activation with borate, the quantity of DMAB (dimethylani-liniumtetrakis(pentafluorophenyl)borate) indicated in Table 2 was added, heated to 70° C., and then mixed with TiBAl (triisobutylaluminum). The solution was cooled to 40° C., and then ethylene at a rate of about 20 to 40 liters/hour was passed through it for one hour at atmospheric pressure. In the copolymerization experiments, first 5 ml of hexene was added before the ethylene was introduced, and ethylene was then passed through. The remaining quantity of hexene was added via a drip funnel within 15 minutes.

The reaction was stopped by adding a mixture of 15 ml of concentrated hydrochloric acid and 50 ml of methanol, and stirring was continued for 15 minutes. After the addition of a further 250 ml of methanol and stirring for 15 minutes, residues were filtered off, then washed three times with methanol, and dried at 70° C. Table 2 summarizes the polymerization and product data.

In Example 29, the complex from Example 1, dichloro-[1-(2-N,N-dimethylaminophenyl)-2,3,4,5-tetramethylcyclopentadienyl]chromium(III) was used, and in Examples 30–34, the complex from Example 6, dichloro-[1-(8-quinolyl)-2,3,4,5-tetramethylcyclopentadienyl]chromium(III), was used;

in Examples 35–45, the complex from Example 8, dichloro-[1-(8-quinolyl)indenyl]chromium(III), was used;

in Examples 46–49, the complex from Example 9, dichloro-[1-(8-quinolyl)-2-methylindenyl]chromium(III) was used; and in Examples 50–51, the complex from Example 10, dichloro±[1-(2-methyl-8-quinolyl)-2,3,4,5-tetramethyl-cyclopentadienyl]chromium(III), was used.

TABLE 2

Polymerization and Product Data for Examples 29–51

| Ex. | Amount Cat. [mg] (μmol) | MAO [mmol] | Al:Cr | Cr:B | Hexene [ml] | T [° C.] | Activity [kg/mol Cr · h] | Yield [g] ([min]) | Density [g/cm³] | η [dl/g] | $M_w$ [g/mol] | $M_n$ [g/mol] | $M_w/M_n$ | % $C_6$ | m.p. [° C.] | $CH_3$/1000 C. |
|---|---|---|---|---|---|---|---|---|---|---|---|---|---|---|---|---|
| 29 | 5.46 (15) | 5.3 | 350 | — | — | 40 | 246 | 3.7 (60') | — | 15.2 | — | — | — | — | — | — |
| 30 | 5.56 (15) | 5.3 | 350 | — | — | 40 | 946 | 14.2 (60') | — | 1.74 | 103001 | 14733 | 6.99 | — | — | — |
| 31 | 7.1 (19) | 6.7 | 350 | — | 30 | 40 | 2620 | 24.9 (30') | 0.919 | 0.88 | 36139 | 10900 | 3.32 | 8.7 | 113.7 | 15.9 |
| 32 | 3.4 (9.1) | — | 80 | 1:1.4 | 20 | 40 | 4560 | 8.3 (12') | 0.914 | 4.05 | 350022 | 120280 | 2.91 | 5.4 | 116.6 | 10.2 |
| 33 | 5.0 (13.5) | 8 | 595 | — | 30 | 40 | 2230 | 30.0 (60') | 0.927 | 0.82 | 21400 | 8824 | 2.45 | 6.7 | 113.7 | 13.6 |
| 34 | 2.1 (5.6) | — | 280 | 1:1.7 | 30 | 40 | 904 | 5.1 (60') | 0.919 | 2.52 | 127045 | 31311 | 4.06 | 4.3 | 117.6 | 8.9 |
| 35 | 5.5 (15) | 5.3 | 350 | — | — | 35 | 107 | 1.6 (60') | — | 22.5 | — | — | — | — | — | — |
| 36 | 6.1 (16.7) | 8.5 | 510 | — | 30 | 60 | 1400 | 23.4 (60') | 0.881 | 2.15 | 132567 | 49540 | 2.68 | 20 | 61.3 | 37.1 |
| 37 | 5.8 (15.8) | 8 | 500 | — | 30 | | 1020 | 16.1 (60') | 0.884 | 6.40 | 740398 | 224534 | 3.3 | 13 | 90.9 | 23.5 |
| 38 | 2.3 (6.3) | 3.15 | 500 | — | 30 | 52 | 873 | 5.5 (60') | 0.904 | 11.6 | — | — | — | 5.9 | 120 | 12 |
| 39 | 1.2 (3.3)ᵃ⁾ | 6.2 | 1870 | — | 30 | 40 | 9700 | 32 (15') | 0.9053 | 11.8 | — | — | — | 6.4 | 99.7 | 12.6 |
| 40 | 1.9 (5.2) | 3.0 | 570 | — | 30 | 40 | 6165 | 16 (30') | 0.9021 | 10.1 | — | — | — | 7.3 | 97.0 | 20.5 |
| 41 | 2 (5.4) | 2.7 | 500 | — | 30 | 40 | 4440 | 12 (30') | 0.9014 | 10.5 | — | — | — | 7.8 | 106.4 | 14.1 |
| 42 | 3.6 (9.8) | 4.9 | 500 | — | — | 40 | 1470 | 7.2 (30') | 0.9042 | 8.92 | — | — | — | 6.0 | 111.6 | 10.0 |
| 43 | 2.5 (6.8) | 3.4 | 500 | — | — | 40 | 4765 | 8.1 (15') | 0.9377 | 10.2 | — | — | — | — | 142.6 | >1 |
| 44 | 1.9 (5.2) | 0.78 | 150 | 1:2.2 | — | 40 | 385 | 2.0 (60') | 0.931 | 26.9 | — | — | — | — | 138.6 | >1 |
| 45 | 2.05 (5.5) | 19.4 | 3520 | — | — | 40 | 2180 | 6.0 (30') | 0.9302 | 9.56 | — | — | — | — | 137.4 | >1 |
| 46 | 2.0 (5.4) | 5.4 | 1000 | — | — | 25 | 1000 | 1.37 (15') | — | 5.78 | — | — | — | — | — | — |
| 47 | 2.0 (5.4) | 5.4 | 1000 | — | — | 25 | 670 | 0.7 (15') | — | 11.75 | — | — | — | — | — | >1 |
| 48 | 2.80 (7.4) | 3.7 | 500 | — | 30 | 40 | 460 | 1.7 (30') | 0.907 | 11.8 | — | — | — | 3.7 | 110.5 | 7.6 |
| 49 | 3.6 (9.5) | 150 | 150 | 1:2 | 30 | 40 | 190 | 0.9 (30') | 0.9027 | 19.4 | — | — | — | 4.0 | 110.4 | 4.9 |
| 50 | 2.0 (5.2) | 5.2 | 1000 | — | — | 25 | 410 | 1.1 (15') | — | 1.13 | — | — | — | — | — | — |
| 51 | 2.1 (5.4) | 0.78 | 1000 | — | — | 25 | 670 | 1.8 (30') | — | 1.21 | — | — | — | — | — | — |

ᵃ⁾The complex was dissolved in 1 ml of 4.8 molar MAO in toluene and diluted with 3 ml of toluene, then added to 250 ml of toluene in autoclaves for the polymerization.

EXAMPLES 52–56

Autoclave Copolymerizations of Ethylene with 1-hexene

In a 1-liter steel autoclave, the MAO quantities (1.6 M in toluene) listed in Table 3, 300 ml of toluene, and 50 ml of hexene were provided. The autoclave was brought to the temperature indicated in Table 3, and the catalyst dissolved in toluene was metered in with ethylene via a gate, so that at the same time the desired ethylene pressure was established.

The data for the polymerization conditions and the product properties are found in Table 3.

In Examples 52–54, the complex from Example 6, dichloro-[1-(8-quinolyl)-2,3,4,5-tetramethylcyclopentadienyl]chromium(III), was used;

in Example 55, the complex from Example 1, dichloro-[1-(2-N,N-dimethylaminophenyl)-2,3,4,5-tetramethylcyclopentadienyl]chromium(III), was used; and in Example 56, the complex from Example 8, dichloro-[1-(8-quinolyl)indenyl]chromium(III), was used.

TABLE 3

Polymerization and Product Data for Examples 52–56

| Ex. | Amount Cat. [mg] ([mol]) | MAO [mmol] | Al:Cr | T [° C.] (p [bar]) | Productivity [g/g sup. cat.] | Activity [kg/mol Cr·h] | Yield [g] ([min]) | density [g/cm³] | η [dl/cm³] | % C₆ | CH₃/1000 C. |
|---|---|---|---|---|---|---|---|---|---|---|---|
| 52 | 1.4* (4) | 0.765 | 190 | 60 (40) | 24290 | 108470 | 34 (5') | 0.9257 | 11.0 | 1.3 | 3.1 |
| 53 | 0.195 (0.5) | 0.765 | 1530 | 70 (20) | 246150 | 1832000 | 48 (3') | 0.9304 | 5.32 | 0.8 | 2.5 |
| 54 | 1.130 (0.35) | 0.765 | 2170 | 70 (10) | 251280 | 336000 | 49 (25') | 0.9294 | 3.02 | 1 | 2.8 |
| 55 | 0.5 (1.37) | 0.765 | 550 | 80 (40) | 74000 | 270070 | 37 (6') | 0.9498 | 1.41 | 1.1 | 2.2 |
| 56 | 1.2 (3.3) | 0.765 | 230 | 70 (20) | 15830 | 115150 | 19 (3') | 0.9195 | 12.05 | ~0.8 | 2.3 |

*The complex was shot in, in the form of powder.

EXAMPLES 57–60

Polymerization of Propene

The corresponding chromium complexes were suspended in 30 ml of toluene and mixed with the applicable quantity of MAO (Table 4) in a nitrogen flask. The propene was introduced into the reaction mixture at room temperature at a gas pressure of 1 bar via a gas introduction tube. After the reaction, the raw product was brought to pH 1 with methanol/hydrochloric acid. After the organic phase was dried, the polymers were obtained in the form of colorless solids.

In Example 57, the complex from Example 1, dichloro-[1-(2-N,N-dimethylaminophenyl)-2,3,4,5-tetramethylcyclopentadienyl]chromium(III) was used, in Example 58, the complex from Example 6, dichloro-[1-(8-quinolyl)-2,3,4,5-tetramethylcyclopentadienyl]chromium(III), was used, and in Examples 59–60, the complex from Example 8, dichloro-[1-(8-quinolyl)indenyl]chromium(III), was used. The polymerization data is shown in Table 4.

TABLE 4

Polymerization data of Examples 57 to 60

| Ex. | Amount Cat. [mmol]/[mg] | t [min] | Yield [g] | Activity [g PP/mmol cat. h bar] | Al:Cr |
|---|---|---|---|---|---|
| 57 | 0.09/33 | 90 | 0.53 | 3.92 | 100:1 |
| 58 | 0.005/2 | 120 | 1.20 | 111 | 100:1 |
| 59 | 0.0054/2 | 240 | 1.06 | 50 | 1000:1 |
| 60 | 0.016/6 | 90 | 0.36 | 15 | 100:1 |

The polypropylene from Example 60 is characterized as follows:

$M_w$: 82024; $M_n$: 7197; $M_w/M_n$: 11.4; viscosity η: 0.53.

EXAMPLE 61

Polymerization of 1-hexene

The complex from Example 8, dichloro-[1-(8-quinolyl)indenyl]chromium(III) (2 mg, 5.4 μmol), was suspended with 10 ml of 1-hexene and mixed in a 50 ml nitrogen flask with 5.4 mmol of methylaluminoxane (1.6 M in toluene) and stirred for 24 hours at room temperature. After the completion of the polymerization, the reaction mixture was adjusted with methanol/hydrochloric acid to pH 1, and the organic phase was dried in a vacuum. The complex is capable of polymerizing hexene.

EXAMPLES 62 AND 63

Polymerization of Ethene in the Presence of $H_2$

The polymerizations were performed analogously to Examples 29–51. In addition, $H_2$ at atmospheric pressure was passed through at a rate of about 10 liters/hour. In Example 62, ethene in the presence of the complex from Example 6 (5.2 mg) and methylalumoxane (Al:Cr=350:1) was polymerized at 40° C. for 25 minutes. It was possible to obtain 7 g of PE. This corresponds to an activity of 1200 g PE/mmol Cr·h. The polymer had a density of 0.9426 g/Cm³ and a viscosity of 5.51 dl/g.

In Example 63, the complex from Example 8 (6 mg) with methylaluminoxane (Al:Cr=500:1) was used at 40° C. After a polymerization time of 15 minutes, 1.2 g of PE could be isolated. This is equivalent to an activity of 350 g PE/mmolCr-h. The polymer had a density of 0.9296 g/cm³ and a viscosity of 17.9 dl/g.

EXAMPLE 64 (COMPARATIVE EXPERIMENT)

Dichloro-[(2-dicyclohexylphosphinoethyl)cyclopentadienyl]chromium was prepared in accordance with DE 197 10 615. Analogously to Examples 62 and 63, 3.1 mg of this complex were contacted with methylaluminoxane (Al:Cr= 350:1) at 40° C. with an ethene/$H_2$ mixture. No polymerization was observed (without $H_2$, the complex was polymerizationactive, with an activity of 125 g PE/mmol/Cr·h under otherwise the same conditions).

EXAMPKES 65–81

Supporting on Silica Gel

As silica gel, ES70X produced by Crossfield was used.

EXAMPLE 65

18.8 ml of MAO (30 weight-% in toluene) (50 mmol) were added to 233 mg of dichloro-[1-(8-quinolyl)-2,3,4,5-tetramethylcyclopentadienyl]chromium(III)·LiCl, partly dissolved in 40 ml of toluene, and the mixture was stirred at room temperature for 15 minutes. Then 8.2 g of silica gel (calcined at 130° C.) were added to the reaction mixture, and the suspension thus obtained was stirred for three hours at room temperature. The solid was then filtered off and washed twice with heptane. The solid thus isolated was dried in a vacuum. Yield: 17.5 g of supported catalyst. The load amounts to 70 μmol per g of carrier, and the Al:Cr ratio of the starting materials was 150:1.

EXAMPLE 66

The procedure of Example 65 was performed with 2.21 g of silica gel, 68.1 of dichloro-(1-(8-quinolyl)indenyl] chromium·KCl, 5 g of MAO (30 weight-% in toluene) and 10 ml of toluene. The yield obtained was 4.8 g of supported catalyst with a loading of 70 μmol Cr per g of carrier (Al:Cr=150:1).

EXAMPLE 67

80.2 mg of dichloro-[1-(8-quinolyl)indenyl] chromium·KCl was dissolved in 4.8 ml of MAO (30 weight-% in toluene) (Cr;Al=1:120) and 0.3 ml of toluene. After 15 minutes of stirring, the solution was slowly added dropwise while stirring to 2.6 g of the silica gel. After one hour of stirring, the solvent was removed in a vacuum. The yield was 4.7 g of the supported catalyst with a loading of 70 mmol Cr per g of carrier.

EXAMPLE 68

5.3 g of the silica gel were placed in a stirring apparatus (6 hours/130° C./vacuum).

In a flask, in succession, 140.1 mg of dichloro-[1-(8-quinolyl)indenyl]chromium·KCl (318 mmol =60 µmol Cr per g of carrier) and 85.7 mg of bis(n-butylcyclopentadienyl) zirconium dichloride (212 mmol=40 µmol Cr per g of carrier) were weighed out. 63.6 mmol of MAO (13.4 ml, 4.75 M in toluene=30 weight-%) were added, and the mixture was stirred at room temperature for 30 minutes (Al:Cr=120:1).

This solution was then dispensed over about ten minutes uniformly, while slowly stirring, into the carrier via a drip funnel. Through a teflon hose, the solution was dripped directly onto the carrier. Further stirring was done for one hour at room temperature, and then the mixture was left to stand a further two hours at room temperature.

Subsequently, the solvent was removed in a vacuum. 9.2 g of the supported catalyst were obtained.

EXAMPLES 69–81

The polymerizations were performed in a 10-liter stirring autoclave. In a nitrogen atmosphere at room temperature, a scavenger alkyl was placed in the autoclave in accordance with Table 5, then 4 liters of isobutane were condensed in. After that, the mixture was heated while stirring to 70° C. and then the weighed-out amount indicated in Table 5 of the supported catalyst was pressed in at an ethylene overpressure. The reactor pressure was then raised with ethylene to a final pressure of 40 bar, and the polymerization was continued for 60 minutes (except in Example 73, which was continued for 90 minutes).

The reaction was ended by depressurizing the reactor, and the products were removed. Table 5 summarizes the polymerization and product data.

EXAMPLE 82

4.2 mg of dichloro-[1-(8-quinolyl)indenyl]chromium (11.5 µmol) and 7.1 mg of [1,3,5-tri-5/2-ethylhexyl]-1,3,5-triazacyclohexane]chromium trichloride (which can be prepared analogously to Köhn et al., Angew. Chem. Int. d. Engl. 1994, 33, pages 1877–1878) were dissolved in 250 ml of toluene. The mixture was heated to 40° C., and 3.4 ml of MAO (15.4 mmol; 4.75 M in toluene) were added (Al:Cr= 650:1).

At 40° C., an ethylene stream was passed through the solution. After 15 minutes, the polymerization was discontinued. 10.4 g of polymer and 2.97 g of a $C_6$ to >$C_{20}$ liquid fraction were obtained. The polymer had a density of 0.9212 g/cm$^3$ and a viscosity of 10.8 dl/g.

What is claimed is:

1. A process for polymerization or copolymerization of olefins, in which olefins are polymerized in the presence of the following components:

(A) a substituted monocyclopentadienyl, monoindenyl, monofluorenyl or heterocyclopentadienyl complex of formula (I)

$$[Y-M-X_n]_m, \quad \text{I}$$

in which the variables have the following meaning:
M is chromium, molybdenum or tungsten,
Y is described by formula II

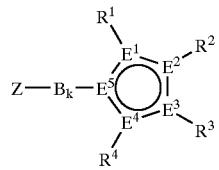

II in which the variables have the following meaning:
$E^1$–$E^5$ are carbon or at maximum one of $E^1$ to $E^5$ is phosphorus or nitrogen,
Z is $NR^5R^6$, $PR^5R^6$, $OR^5$, $SR^5$, or an unsubstituted, substituted or condensed, partially unsaturated heterocyclic or hetetoaromatic ring system,

TABLE 5

| Ex. | Cat. (Ex.) | Weight [mg] | Yield [g PE] | Activity [kg PE/mol Cr] | η [dl/g] | Density [g/cm³] | Scavenger alkyl[b] [mg] |
|---|---|---|---|---|---|---|---|
| 69 | 65 | 637 | 500 | 780 | 16.68 | 0.9346 | 120 Tibal |
| 70 | 65 | 631 | 500 | 790 | 13.18 | 0.9363 | 200 ATE |
| 71 | 65 | 640 | 580 | 900 | 19.29 | 0.9343 | 50 Dealox |
| 72 | 65 | 513 | 550 | 1100 | 15.45 | 0.9354 | 50 Buli |
| 73 | 65 | 592 | 650 | 1400 | 15.83 | 0.9358 | 50 Buli |
| 74 | 65 | 680 | 550 | 800 | 21.88 | 0.9348 | 100 DEAC |
| 75 | 65 | 600 | 600 | 1000 | 16.65 | 0.9365 | 80 TEB |
| 76 | 65 | 670 | 600 | 1200 | 16.8 | 0.9367 | 130 Bomag |
| 77 | 66 | 586 | 500 | 900 | 42.14 | 0.927 | 80 Buli |
| 78 | 66 | 650 | 750 | 1200 | 52.97 | 0.9265 | 130 Bomag |
| 79 | 67 | 833 | 900 | 1100 | 48.74 | 0.9261 | 80 Buli |
| 80 | 68 | 140 | 1200 | 8600[a] | 7.68 | 0.9495 | 80 Buli |
| 81 | 68 | 135 | 1100 | 8100[a] | 5.84 | 0.9466 | 130 Bomag |

[a]Activity pertains to kg PE/mol (Cr + Zr)
[b]Tibal (triisobutylaluminum), ATE (aluminumtriethyl), Dealox (tetraethyldialuminumoxane), Buli (butyllithium), DEAL (diethylaluminum chloride), TEB (triethylborane), Bomag (butyloctylmagnesium)

B is one of the following groups:

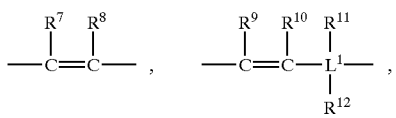

and additionally, if Z is an unsubstituted, substituted or condensed, partially unsaturated heterocyclic or heteroaromatic ring system, B can also be

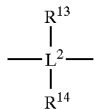

in which
$L^1$, $L^2$ denotes silicon or carbon,
k denotes 1, or if Z is an unsubstituted, substituted or condensed, partially unsaturated heterocyclic or heteroaromatic ring system, is also 0,
X independently of one another fluorine, chlorine, bromine, iodine, hydrogen, $C_1$–$C_{10}$ alkyl, $C_2$–$C_{10}$ alkenyl, $C_6$–$C_{20}$ aryl, alkylaryl with from 1 to 10 C atoms in the alkyl radical and from 6 to 20 C atoms in the aryl radical, $NR^{15}R^{16}$, $OR^{15}$, $SR^{15}$, $SO_3R^{15}$, $OC(O)R^{15}$, CN, SCN, β-diketonate, CO, $BF_4{}^-$, $PF_6{}^-$, or bulky non-coordinating anions,
$R^1$–$R^{16}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, $SiR^{17}{}_3$, in which the organic radicals $R^1$–$R^{16}$ can also be substituted by halogens, and two geminal or vicinal radicals $R^1$–$R^{16}$ can also be joined to a 5- or 6-membered ring,
$R^{17}$ independently of one another hydrogen, $C_1$–$C_{20}$ alkyl, $C_2$–$C_{20}$ alkenyl, $C_6$–$C_{20}$ aryl, alkylaryl with from 1 to 10 C atoms in the alkyl radical and from 6 to 20 C atoms in the aryl radical, and two geminal radicals $R^{17}$ can also be joined to a 5- or 6-membered ring,
n is 1, 2 or 3,
m is 1, 2 or 3,
(B) optionally, one or more activator compounds, and
(C) one or more additional catalysts conventionally used for the polymerization of olefins.

2. The process of claim 1, in which the activator compound (B) is a compound selected from the group of aluminum oxane, dimethylanilinium tetrakispentafluorophenyl borate, trityltetrakispentafluorophenyl borate, or trispentafluorophenylborane.

3. The process of claim 1, in which at least one olefin selected from the group of ethene, propene, 1-butene, 1-pentene, 1-hexene, 1-heptene, 1-octene and 1-decene is polymerized.

4. The process of claim 1, in which an olefin selected from the group of propene, 1-butene, 1-pentene, 1-hexene, 1-heptene and 1-octene is polymerized.

5. The process of claim 1, in which the polymerization is conducted in suspension, in solution, or in the gas phase.

6. Polymers of olefins, obtainable by the method of claim 1.

7. Fibers, films and moldings, containing polymers of olefins of claim 6 as essential components.

8. The process of claim 1, in which M is chromium.

9. The process of claim 1, in which Z is an unsubstituted, substituted or condensed heteroaromatic ring system.

10. The process of claim 1, in which $E^1E^2E^3E^4E^5$ together with $R^1R^2R^3R^4$ is unsubstituted or substituted indenyl.

11. The process of claim 1, in which component (C) comprises at least one conventional olefin polymerisation catalyst selected from the group consisting of Ziegler-Natta catalysts, Phillips catalysts, metallocenes, constrained geometry complexes, nickel and palladium bisimine catalyst systems, iron and cobalt pyridine bisimine compounds and chromium amides.

12. The process of claim 1, in which component (A) and/or component (C) is immobilized on an organic or inorganic support.

13. The process of claim 1, in which component (C) is used for the in situ preparation of comonomers.

* * * * *